United States Patent Office 3,383,509
Patented May 14, 1968

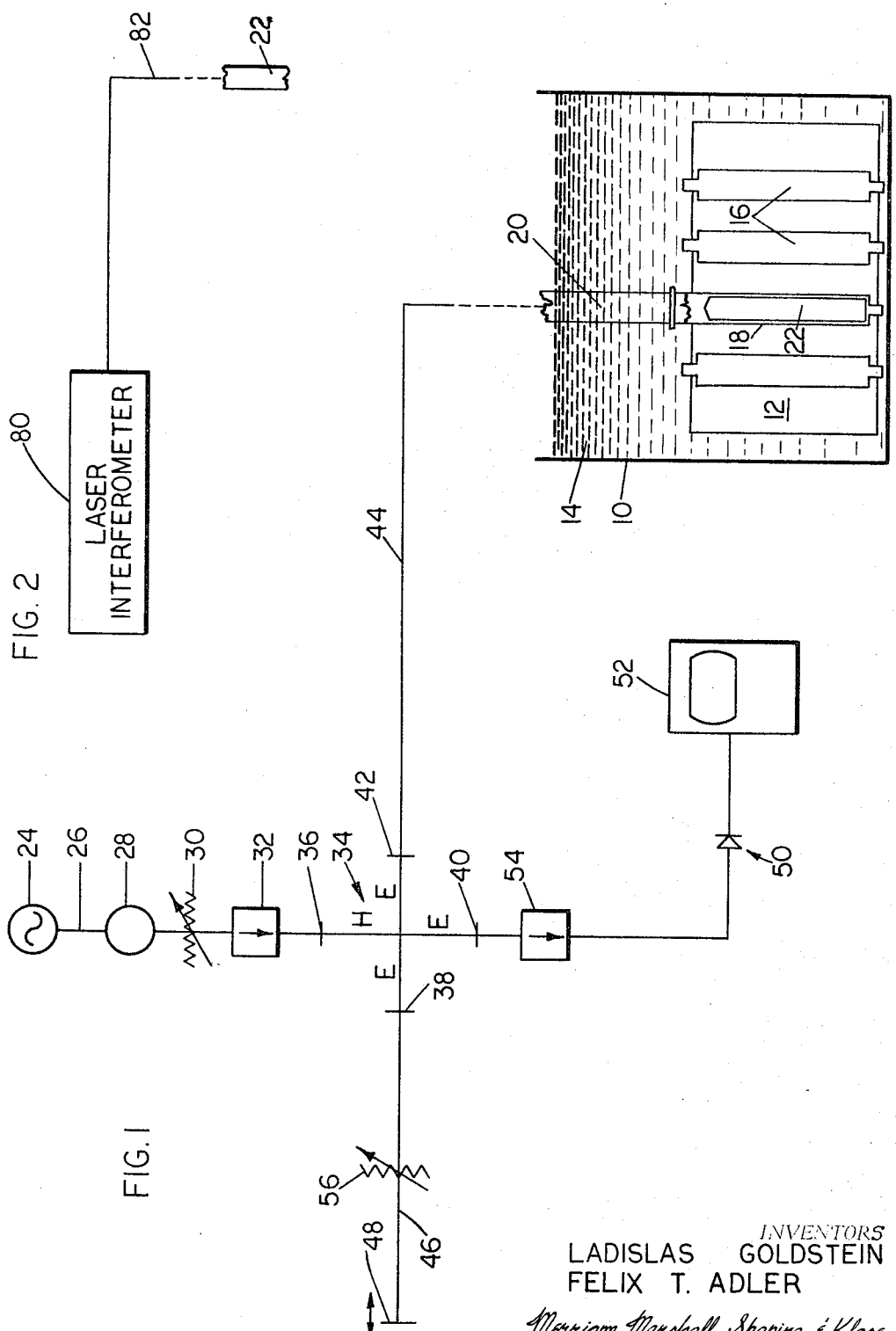

3,383,509
USE OF GAMMA RADIATION RESPONSIVE GAS IONIZED BY GAMMA RADIATION IN A NUCLEAR REACTOR AND MEASURING THE GAMMA RADIATION IONIZATION EFFECTS
Ladislas Goldstein and Felix T. Adler, Urbana, Ill., assignors to University of Illinois Foundation, Urbana, Ill., a corporation of Illinois
Filed Nov. 29, 1965, Ser. No. 510,253
3 Claims. (Cl. 250—83.6)

ABSTRACT OF THE DISCLOSURE

A gaseous medium inserted into a nuclear reactor to be ionized by gamma radiation during the reaction. The effects of the ionization of the gaseous medium resulting from the gamma radiation are measured using electromagnetic measuring apparatus to determine reactor characteristics such as reactor power level, etc.

---

This invention relates to nuclear reactors and in particular to the monitoring of the reactor power level and variations thereof.

Present techniques for measuring nuclear reactor responses to reactivity changes require the insertion of some form of an appropriate detecting device into the reactor, in particular inside or near the reactor core, with the "in-pile" device being coupled to an "out-of-pile" recording instrument. Care must be taken to insure that the physical mechanisms inserted into the reactor are not functionally impaired by the ambient radiation. Also, the presently available neutron or gamma flux detecting devices are capable of operating normally below a predetermined power of the reactor level and within a somewhat limited range, beyond which, however, the devices become practically useless.

The present invention is based on the use of an electromagnetic wave to measure the state of the reactor. In view of the speed of propagation of such waves, practically instantaneous measurements of the power level can be obtained, and the only time limitations arise from the out-of-pile electronic circuitry. Specifically, the responses of a nuclear reactor are obtained by measurements of the effects of the ambient gamma radiation on electromagnetic wave propagation inside the reactor core or reflector regions. This is especially useful in determining, for instance, rapid changes of the reactor power level.

It is well known that the intensity of the gamma radiation or flux inside a reactor operating at a substantial power level depends on the number of fissions per second and is thus roughly proportional to the power level of the reactor. By placing a cavity containing a gas within the radiation area, the gamma radiation produces in that cavity a substantial ionization, and thus a plasma. Using standard microwave or laser interferometric techniques to directly measure the electron density produced in the cavity, the number of fissions per second or the reactor power level is thus obtained.

The principle on which this invention is based will be better understood from the following detailed description thereof taken in conjunction with the accompanying drawings in which:

FIGURE 1 illustrates schematically an embodiment of apparatus utilized in accordance with the teachings of the present invention; and FIGURE 2 illustrates schematically an alternative embodiment utilizing a laser interferometer.

Referring to FIGURE 1 there is illustrated a tank 10 containing a nuclear reactor core 12 within a coolant 14, such as water. The reactor includes a number of lattice positions 16, each containing a fuel element, which constitutes the core of the reactor 12. The reactor core in a known manner can be surrounded by a solid or liquid reflector. Within any desired empty fuel lattice position 18 there is placed a circular wave guide 20 having at one end thereof a quartz cylindrical tube or bottle 22 filled with an inert gas, such as helium, neon, or other gas mixtures. A circular wave guide was used in the device built to establish the feasibility of this invention. Hollow wave guides of other shapes, coaxial cables, dielectric wave guides, resonant cavities, and combinations of such and related structures can also be used to advantage. It must be understood that these structures could be inserted in the reactor core, or in reflectors, or any other desired position such as breeding blankets or shields. The gamma radiation produced as a by-product during a chain reaction acts directly and/or indirectly to ionize the gas within the bottle 22 to produce a plasma having a free electron density related in particular to the intensity of the gamma radiation. Any standard microwave interferometer and/or any other plasma diagnostic tool can be utilized to measure the electron density produced by the ambient gamma radiation. For this particular illustration of the principle of the invention, the changes caused by the presence of the plasma, in reflection and attenuation of a microwave signal propagated in the wave guide, provide the information necessary to determine the instantaneous reactor power level.

In the remaining portion of FIGURE 1 there is illustrated an example of a microwave interferometer which is utilized to detect the changes in reflection and attenuation of the electromagnetic energy in the wave guide 20. This consists of a microwave oscillator 24 coupled by a wave guide 26 to a frequency meter 28 for setting the oscillator frequency, which in this instance was about 6K mc./s. A variable attenuator 30 is provided for adjusting to a suitable low level the amplitude of the electromagnetic wave input into 32. Within this signal generating branch there is provided an isolator 32 which prevents the radiation of electromagnetic energy back into the oscillator 24. The adjusted output of oscillator 24 is coupled to an H arm of a magic T 34 at an input port 36. The magic T 34, also known as a hybrid T, includes 3 E-plane arms as indicated in FIGURE 1 which are coupled to ports 38, 40, and 42. The magic T 34 is a well known microwave coupling device in which the arms are arranged such that an electromagnetic wave input as port 36 is divided into two equal electromagnetic waves coupled out of the magic T at the ports 38 and 42. Similarly, electromagnetic wave inputs at ports 38 and 42 are combined in the magic T and coupled out of the port 40. Thus, the adjusted output of oscillator 24 is transmitted through the wave guide 44, containing the gas filled bottle 22, and also through the port 38 to a shorted wave guide transmission line 46. Reflected signals from the transmission line 46 which is terminated in moveable short 48, and a reflected wave from the gas filled tube 22 are both coupled through respective ports 38 and 42, and out of the T port 40.

The electromagnetic wave signal output of port 40 is coupled to a microwave detector 50 for detection of the microwave signal, with the output of the detector 50 coupled to an oscilloscope 52. An isolator 54 has been provided in the output signal path to prevent the coupling of undesired signals back to the port 40. It is understood, of course, that where the wave guide 44 is of a rectangular configuration, well known transition pieces may be utilized to couple the circular wave guide 20 to the wave guide 44.

In the operation of the illustrated interferometer of FIGURE 1, the wave guide electrical lengths are initially adjusted with a gaseous medium in the bottle 22 so that changes in the reflection and attenuation of the electromagnetic waves due to the subsequent presence of a suitable plasma in the bottle can be detected. This is accomplished by adjusting the sliding short 48 and a variable attenuator 56 in the wave guide 46 with the reactor practically at zero power level. The wave guide configuration shown in FIGURE 1 effectively operates as a microwave bridge circuit so that the variable short 48 and the attenuator 56 are adjusted for a 0° phase difference between the reflected signal input to port 38 from sliding short 48 and the reflected signal input to port 42 from the shorted wave guide 20 containing the gaseous dielectric medium in the bottle 22. Now as the reactor power level is increased, the electromagnetic wave signal propagated in the resulting plasma will undergo a change in its velocity and thus a phase lag, and in addition some attenuation in the reflected signal will occur. This operation effectively unbalances one arm of what may be considered the bridge circuit since the reflected electromagnetic signal from wave guide 20 containing the plasma medium is coupled to the port 42 of the magic T and is detected at the detector 50 and displayed on the scope 52. As the degree of ionization changes in time, the reflected signal which is coupled into the magic T 34 deviates from its initial value, thus showing a fringe pattern reflecting the changes in the dielectric constant of the plasma medium in the bottle 22. From a recording of this signal change on the oscilloscope 52, the electron density in the core 12 of the nuclear reactor can be determined in a well known manner. Since the electron density is directly related to the gamma flux, which in turn depends on the number of fissions per second, the power level of the reactor is thus monitored.

It must be realized, of course, that other means can be utilized to detect the effects of the gamma radiation on electromagnetic wave propagation inside the reactor core. For example, as indicated above instead of a wave guide configuration, a coaxial cable, and/or a cavity containing a gas filled container and placed within the reactor core could also function in accordance with the teachings of this invention. Similarly, a cooling duct in a gas-cooled reactor can be utilized as part of the transmission guide structure. In this case the gas container can be omitted, and the ionization of the coolant could be measured directly to indicate the responses and the power level of the reactor. Furthermore, the form of the output signal from the interferometer may be particularly suitable to actuate automatic control devices governing the motion of control rods or other control and safety elements.

The microwave signal has two distinct and intrinsic advantages: It lends itself readily to digitalization and it can be propagated through space, as a radio signal, to achieve remote control from a point distant from the reactor either for research, power station, or space applications.

As alternatives to the microwave interferometer techniques as illustrated herein to analyze the reflected signals from the gaseous medium, well known Faraday rotation or resonance measurement techniques (cyclotron resonance) can be employed. These techniques would, however, require the insertion of devices such as coils or ferrites to produce a suitable magnetic field inside the reactor and may be less direct than the interferometeric method herein described. An example of one alternative embodiment is shown in FIGURE 2, wherein a laser interferometer 80 is coupled by suitable means 82 to the plasma medium 22. Such interferometers 80 are well known and utilize a laser beam in a similar manner as previously described in the embodiment of FIGURE 1.

It can thus be realized that in accordance with the teachings of the present invention, the status of the reactor is observed by analyzing the effect of the plasma on the amplitude, phase or polarization of an electromagnetic wave of an appropriate frequency or frequencies passing through the plasma in the presence or absence of extra magnetic fields.

As an example of the measurements previously described, one of the outermost fuel elements of a nuclear reactor was replaced by a shorted circular aluminum wave guide having an inside diameter of 3.17 centimeters and containing quartz cylindrical tubes of various lengths filled with neon at 46 torr. This in-core section of the wave guide was connected by a 16 ft. long section of aluminum wave guide to the microwave circuit located above the water level of the tanks. The circular wave guide was connected by a transition to rectangular wave guide and then to the "unknown" arm of a magic T bridge as illustrated in FIGURE 1. The reactor was then pulsed to approximately 250 megawatts and the gamma flux values determined from the practice of the present invention agreed very closely with values obtained by direct measurement using other known methods. For the gas and the pressures used in these experiments, the minimum reactor power level for which ionization could be reliably detected was 40 kilowatts. By choosing suitable gases or gas mixtures at appropriate pressures and by choosing suitable frequencies for the electromagnetic waves, one can tailor the sensitivity of the instrument to existing engineering requirements over a much larger range of power levels. Thus, the teachings of the present invention provide an excellent technique to measure and monitor the reactor response instantaneously over many orders of magnitude in power without recourse to conventional in-core instrumentation. Further, instead of utilizing a reflected signal from the plasma medium, the effects of the plasma on a signal traversing the medium could also be detected.

The present invention may also be useful in the following applications:

(1) As a monitor in power reactors to obtain records of fuel burn-up in a given reactor zone by utilizing the capability of this device to measure local properties in the core;

(2) To monitor various parts of a large power reactor independently, e.g., as a safety device;

(3) To detect the escape of fuel and/or fission products in case of fuel element rupture (e.g., by monitoring the gas or fog or droplet coolant in a gas or vapor-cooled reactor for its ionization level) or for other coolants by a suitable positioning of such a device;

(4) As investigative and safety devices in the study of reactor excursions;

(5) Potentially (e.g., by coating parts of the gas container with a very thin layer of U-235) as a novel neutron detector, by measuring directly the enhanced plasma density due to the ionization caused by fission products;

(6) As instrumentation in propulsion reactors for aerospace applications, where both performance monitoring and control could be performed by the use of microwave signals;

(7) As instrumentation of critical and subcritical assemblies used in the investigation of chain reacting systems; and (8) As instrumentation for specialized chain reacting systems such as gaseous core reactors.

The foregoing detailed description has been given for clearness of understanding only, and no unnecessary limitations should be understood therefrom, as modification will be obvious to those skilled in the art.

What is claimed is:

1. In a nuclear reactor, the improvement of means for measuring the power level and variations thereof of a nuclear chain reacting system by detecting the effects of ionization of a gaseous medium directly produced by ambient gamma radiation, said means comprising:

a microwave energy source of known frequency;
 a gamma radiation responsive gaseous medium having
  a low thermal neutron absorbing cross-section with
  a substantially non-responsive characteristic to neutron flux and a significantly greater response to said gamma radiation, said gaseous medium inserted in the radiation area of said reactor to directly ionize said gaseous medium and form a plasma medium in direct response to said gamma radiation with relatively minor and insignificant response to said neutron flux;

means coupled to said microwave energy source to direct an incident signal therefrom to within said plasma medium; and detection means including means for comparing an emergent microwave signal from said plasma medium relative to said incident signal to determine the effects of said gamma radiation on said gamma radiation responsive gaseous medium.

2. The improvement as claimed in claim 1, wherein said microwave energy source comprises a microwave oscillator.

3. The improvement as claimed in claim 1, wherein said emergent signal comprises a reflected signal from said plasma medium.

References Cited

UNITED STATES PATENTS

| | | | |
|---|---|---|---|
| 2,982,855 | 5/1961 | Wickersham | 324—58.5 X |
| 3,130,307 | 4/1964 | Russell | 250—83.1 |
| 3,265,967 | 8/1966 | Heald | 324—58.5 |
| 2,795,704 | 6/1957 | Bryant et al. | 250—83.6 |
| 2,874,304 | 2/1959 | Lichtenstein | 250—83.6 |

OTHER REFERENCES

Takeda et al.: "Improvements in the Microwave Propagation Method of Studying Decaying Gas Plasmas," the Review of Scientific Instruments, vol. 30, No. 8, Aug. 19, 1959, pp. 722–725.

S. Glasstone et al.: "Controlled Thermonuclear Reactions," 1966, pp. 173–176.

Nuclear Science Abstracts, vol. 19, No. 7, Apr. 15, 1965, Abstract No. 12631, pp. 1517 and 1518, Theory of the Laser Interferometer and Its Use in Plasma Diagnostics.

REUBEN EPSTEIN, *Primary Examiner.*